United States Patent [19]

Haddock et al.

[11] 3,853,938
[45] Dec. 10, 1974

[54] THIOPROPIONIC ACID DERIVATIVES

[75] Inventors: Ernest Haddock; William J. Hopwood, both of Kent, England

[73] Assignee: Shell Oil Company, New York, N.Y.

[22] Filed: Jan. 2, 1973

[21] Appl. No.: 320,236

[52] U.S. Cl. .............................. 260/455 R, 71/100
[51] Int. Cl. ......................................... C07c 153/07
[58] Field of Search ..................... 260/455 R, 471

[56] References Cited
UNITED STATES PATENTS

| | | | |
|---|---|---|---|
| 3,598,859 | 8/1971 | Yates et al. | 260/471 |
| 3,673,237 | 6/1972 | Janiak | 71/100 |
| 3,766,244 | 10/1973 | Giacobbe et al. | 71/100 |

FOREIGN PATENTS OR APPLICATIONS

| | | | |
|---|---|---|---|
| 1,164,160 | 9/1969 | Great Britain | 260/471 |

*Primary Examiner*—Lewis Gotts
*Assistant Examiner*—D. R. Phillips

[57] ABSTRACT

Thiopropionic acid derivatives of the formula

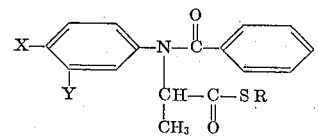

where X is fluorine or chlorine; Y is hydrogen or chlorine; and R is alkyl, cycloalkyl, alkenyl, or aryl, are useful as herbicides, particularly as selective herbicides for the control of wild oat in cereal crops such as barley.

1 Claim, No Drawings

THIOPROPIONIC ACID DERIVATIVES

FIELD OF THE INVENTION

This invention relates to novel herbicidal thiopropionic acid derivatives, to herbicidal compositions containing them, and to a method of controlling undesirable plant growth with these derivatives.

BACKGROUND OF THE INVENTION

Under modern methods of agriculture it has been found possible to leave cereal crops standing until full ripening of the ears has taken place. This was not the case formerly when harvesting was more dependent on weather conditions and took place over a longer period. Unfortunately wild oat matures more rapidly than grain crops and, when this weed is present, a proportion of its seeds are now shed into the soil before harvesting takes place; by this means serious infestation of arable land by wild oat has occurred. Moreover, it is very difficult to separate wild oat seeds from the seeds of other grain crops and the presence of wild oat in, for example, a sample of seed wheat seriously affects its merchantable quality. Attempts at chemical control of this pest have been made but up to now these have not been entirely successful. It has now been discovered that a new class of thiopropionic acid derivatives have useful selective herbicidal properties, and in particular give improved control of wild oat in barley.

SUMMARY OF THE INVENTION

Accordingly the present invention provides thiopropionic acid derivatives of formula:

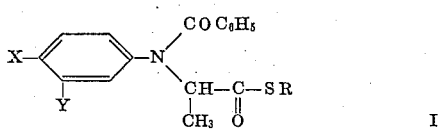
I where X is fluorine or chlorine, Y is hydrogen or chlorine and R is alkyl, cycloalkyl, alkenyl or aryl.

DESCRIPTION OF THE PREFERRED EMBODIMENTS

Typical novel compounds of this invention are those of Formula I where R is alkyl of 1 to 6 carbon atoms, such as methyl, ethyl, isopropyl, tert-butyl, and the like, cycloalkyl of 3 to 6 carbon atoms, such as cyclopropyl, cyclopentyl, cyclohexyl, and the like, alkenyl of 2 to 6 carbon atoms, such as propenyl, allyl, vinyl and the like, or aryl of 6 to 10 carbon atoms such as phenyl or naphthyl.

Typical compounds contemplated for use with the scope of this invention are the following:
S-ethyl N-benzoyl-N-(3-chloro-4-fluorophenyl)-2-aminothiopropionate
S-isopropyl N-benzoyl-N-(3-chloro-4-fluorophenyl)-2-aminothiopropionate
S-ethyl N-benzoyl-N-(4-fluorophenyl)-2-aminothiopropionate
S-ethyl N-benzoyl-N-(3,4-dichlorophenyl)-2-aminothiopropionate.

Preferred compounds are those where R is methyl, ethyl, propyl, isopropyl, cyclopropyl, propenyl, or phenyl.

Particularly preferred because of their selective herbicidal activity are S-ethyl-N-benzoyl-N-(4-fluorophenyl)-2-aminothiopropionate and S-ethyl N-benzoyl-N-(3,4-dicholorophenyl)-2-aminothiopropionate.

The thiopropionic acid derivatives of the invention are prepared from the corresponding propionic acid by conversion of this acid to a derivative thereof of formula:

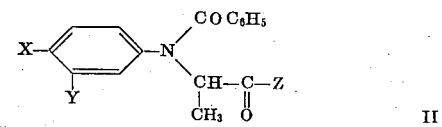
II wherein Z represents a halogen, for example chlorine, atom, an alkoxycarbonyloxy group, for example isobutoxycarbonyloxy, or an imidazolo group, and reacting this derivative with a mercaptan of formula:

III preferably in a suitable organic solvent such as toluene or methylene chloride.

Alternatively the thiopropionic acid derivatives may be obtained by hydrolysis of an acid salt of a thiocarboximidic ester of formula:

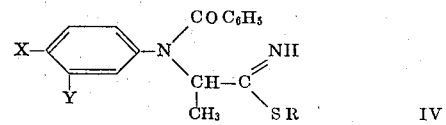
IV

Such acid salts may be prepared by the process described in copending Ser. No. 205,319, filed Dec. 6, 1971, now U.S. Pat. No. 3,790,614 the disclosure of which is hereby incorporated by reference.

As mentioned above the compounds of the invention are of interest as herbicides and in particular as selective herbicides for the post emergence control of wild oats in cereal such as barley and in other crops. The invention includes therefore within its scope herbicidal compositions comprising a carrier or a surface-active agent, or both a carrier and a surface-active agent, together with, as active ingredient, at least one thiopropionic derivative of the invention. Likewise the invention includes also a method of combating wild oats at a locus which comprises applying to the locus a herbicidally effective amount of a thiopropionic acid derivative or composition of the invention.

The term 'carrier' as used herein means a solid or fluid material, which may be inorganic or organic and of synthetic or natural origin, with which the active compound is mixed or formulated to facilitate its application to the plant, seed, soil or other object to be treated, or its storage, transport or handling.

The surface-active agent may be an emulsifying agent or a dispersing agent or a wetting agent; it may be nonionic or ionic.

Any of the carrier materials or surface-active agents usually applied in formulating pesticides may be used in the compositions of the invention, and suitable examples of these are to be found, for example, in our British specification No. 1,164,160.

The compositions of the invention may be formulated as wettable powders, dusts, granules, solutions, emulsifiable concentrates, emulsions, suspension concentrates and aerosols. Wettable powders are usually compounded to contain 25, 50 or 75 percent w of toxicant and usually contain, in addition to solid carrier, 3–10 percent w of a dispersing agent and, where necessary, 0–10 percent w of stabiliser(s) and/or other additives such as penetrants or stickers. Dusts are usually formulated as a dust concentrate having a similar composition to that of a wettable powder but without a dispersant, and are diluted in the field with further solid carrier to give a composition usually containing ½–10 percent w of toxicant. Granules are usually prepared to have a size between 10 and 100 BS mesh (1.676 – 0.152 mm), and may be manufactured by agglomeration or impregnation techniques. Generally, granules will contain ½–25 percent w toxicant and 0–10 percent w of additives such as stabilisers, slow release modifiers and binding agents. Emulsifiable concentrates usually contain, in addition to the solvent and, when necessary, co-solvent, 10–50 percent w/v toxicant, 2–20 percent w/v emulsifiers and 0–20 percent w/v of appropriate additives such as stabilisers, penetrants and corrosion inhibitors. Suspension concentrates are compounded so as to obtain a stable, non-sedimenting, flowable product and usually contain 10–75 percent w toxicant, 0.5–15 percent w of dispersing agents, 0.1–10 percent w of suspending agents such as protective colloids and thixotropic agents, 0–10 percent w of appropriate additives such as defoamers, corrosion inhibitors, stabilisers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersions and emulsions, for example, compositions obtained by diluting a wettable powder or a concentrate according to the invention with water, also lie within the scope of the present invention. The said emulsions may be of the water-in-oil or of the oil-in-water type, and may have a thick 'mayonnaise'-like consistency.

The compositions of the invention may also contain other ingredients, for example, other compounds possessing pesticidal, especially insecticidal, acaricidal, herbicidal or fungicidal properties.

The invention is further illustrated in the following examples, in which the structure of each product was confirmed by elemental analysis.

EXAMPLE 1

S-isopropyl N-benzoyl-N-(3,4-dichlorophenyl)-2-aminothiopropionate

N-benzoyl-N-(3,4-dichlorophenyl)-2-aminopropionic acid (8.5 g) and thionyl chloride (3.0 g) in methylene chloride (200 ml) were stirred at 20°C for 24 hours. Excess isopropyl mercaptan was then added and the solution was stirred for a further 24 hours at 20°C. The solution was washed with saturated sodium bicarbonate solution and dried over sodium sulfate and the solvent was removed under reduced pressure. The residue was crystallized from petroleum ether (b.p. 40°–60°C) to give the desired product m.p. 34°–36°C.

EXAMPLE 2

S-cyclopropyl N-benzoyl-N-(3,4-dichlorophenyl)-2-amino-thiopropionate

N-benzoyl-N-(3,4-dichlorophenyl)-2-aminopropionic acid (8.4 g) was dissolved in methylene chloride (100 ml) and to this solution was added carbonyl diimidazole (2.5 g). The mixture was stirred for 30 minutes at room temperature. Cyclopropyl mercaptan (3.6 ml) was then added to the solution which was stirred at room temperature for a further 16 hours. The solvent was removed under reduced pressure and the residue was purified by crystallization from petroleum ether (b.p. 60°–80°C) to give the desired product m.p. 88°–90°C.

EXAMPLE 3

S-ethyl N-benzoyl-N-(4-fluorophenyl)-2-aminothiopropionate

N-benzoyl-N-(4-fluorophenyl)-2-aminopropionic acid (5.6 g) and triethylamine (2.8 ml) in toluene (70 ml) were stirred together at 0°–5°C for 5 minutes. Isobutyl chloroformate (2.1 ml) was added to the cooled solution and the mixture was stirred for a further 30 minutes. Excess ethyl mercaptan was then added and the solution was stirred at room temperature for 16 hours. The solvent was then removed under reduced pressure and the residue was crystallized from petroleum ether (b.p. 60°–80°C) to give the desired product m.p. 54°–56°C.

EXAMPLE 4

Following procedures similar to those of examples 1–3 compounds of Table 1 were prepared.

Table 1

| Compound | Melting Point °C |
|---|---|
| S-ethyl N-benzoyl-N-(3,4-dichlorophenyl)-2-amino-thiopropionate | 84–86 |
| S-phenyl N-benzoyl-N-(3,4-dichlorophenyl)-2-amino-thiopropionate | Oil |
| S-allyl N-benzoyl-N-(3,4-dichlorophenyl)-2-amino-thiopropionate | 60–62 |
| S-methyl N-benzoyl-N-(3,4-dichlorophenyl)-2-amino-thiopropionate | 126–128 |
| S-propyl N-benzoyl-N-(3,4-dichlorophenyl)-2-amino-thiopropionate | 76–78 |
| S-isopropyl N-benzoyl-N-(4-fluorophenyl)-2-amino-thiopropionate | 55–57 |
| S-allyl N-benzoyl-N-(4-fluorophenyl)-2-amino-thiopropionate | 50–51 |
| S-isopropyl N-benzoyl-N-(4-chlorophenyl)-2-amino-thiopropionate | 30–32 |
| S-ethyl N-benzoyl-N-(4-chlorophenyl)-2-amino-thiopropionate | 62–64 |

EXAMPLE 5

Herbicidal Activity

To evaluate their herbicidal activity, the compounds of the invention were tested using as a representative range of plants: maize, Zea mays (Mz); oat, Avena sativa (O); ryegrass Lolium perenne (R); pea, Pisum sativum (P); linseed, Linum usitatissium (L); mustard, Sinapis alba (M); and sugar beet, Beta vulgaris (SB).

The tests fall into two categories, pre-emergence and post-emergence. The pre-emergence tests involved spraying a liquid formulation of the compound onto the soil in which the seeds of the plant species mentioned above had recently been sown. The post-emergence tests involved two types of test, viz. soil drench and foliar spray tests. In the soil drench tests the soil in which seedling plants of the above species were growing, was drenched with a liquid formulation containing a compound of the invention, and in the foliar spray tests the seedling plants were sprayed with such a formulation.

The soil used in the tests was a steam-sterilised, modified John Innes Compost mixture in which half the peat, by loose bulk, had been replaced by vermiculite.

The formulations used in the tests were prepared by diluting with water and solutions of the compounds in acetone containing 0.4 percent by weight of an alkylphenol/ethylene oxide condensate available under the trade name Triton X-155. In the soil spray and foliar spray tests the acetone solutions were diluted with an equal volume of water and the resulting formulations applied at two dosage levels corresponding to 10 and 1 kilograms of active material per hectare respectively in a volume equivalent to 400 litres per hectare. In the soil drench tests one volume of the acetone solution was diluted to 155 volumes with water and the resulting formulation applied at one dosage level equivalent to 10 kilograms of active material per hectare in a volume equivalent to approximately 3,000 litres per hectare.

In the pre-emergence tests untreated sown soil and in the post-emergence tests untreated soil bearing seedling plants were used as controls.

The herbicidal effects of the compounds were assessed visually seven days after spraying the foliage and drenching the soil and eleven days after spraying the soil, and were recorded on a 0–9 scale. A rating 0 indicates no effect on the treated plants, a rating 2 indicates a reduction in fresh weight of stem and leaf of the plants of approximately 25 percent, a rating 5 indicates a reduction of approximately 55 percent and a rating 9 indicates a reduction of 95 percent. The results of the tests are set out in Table 2.

TABLE 2

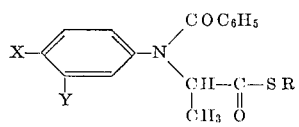

| Compound | | | Dosage, kg./ha. | Post-emergence | | | | | | | | | | | | | | Pre-emergence Soil spray | | | | | | |
|---|---|---|---|---|---|---|---|---|---|---|---|---|---|---|---|---|---|---|---|---|---|---|---|---|
| | | | | Soil drench | | | | | | | Foliar spray | | | | | | | | | | | | | |
| X | Y | R | | Mz | O | RG | P | L | M | SB | Mz | O | RG | P | L | M | SB | Mz | O | RG | P | L | M | SB |
| Cl | Cl | C₂H₅ | 10 | 0 | 6 | 0 | 0 | 0 | 0 | 0 | 0 | 6 | 0 | 5 | 5 | 2 | 1 | 0 | 5 | 0 | 0 | 6 | 3 | 0 |
| | | | 1 | | | | | | | | 0 | 5 | 0 | 1 | 2 | 0 | 0 | 0 | 2 | 0 | 0 | 0 | 0 | 0 |
| Cl | Cl | Cyclopropyl | 10 | 0 | 0 | 0 | 0 | 0 | 0 | 0 | 0 | 6 | 0 | 4 | 6 | 2 | 0 | 0 | 0 | 0 | 0 | 4 | 0 | 0 |
| | | | 1 | | | | | | | | 0 | 0 | 0 | 0 | 5 | 0 | 0 | 0 | 0 | 0 | 0 | 0 | 0 | 0 |
| Cl | Cl | CH₂CH=CH₂ | 10 | 0 | 0 | 0 | 0 | 0 | 0 | 0 | 5 | 6 | 0 | 4 | 6 | 4 | 0 | 4 | 6 | 0 | 0 | 7 | 7 | 0 |
| | | | 1 | | | | | | | | 0 | 1 | 0 | 1 | 6 | 1 | 0 | 0 | 0 | 0 | 0 | 0 | 0 | 0 |
| F | H | C₂H₅ | 10 | 0 | 5 | 0 | 0 | 0 | 0 | 0 | 4 | 5 | 1 | 0 | 6 | 5 | 0 | 0 | 8 | 0 | 0 | 6 | 0 | 0 |
| | | | 1 | | | | | | | | 1 | 5 | 0 | 0 | 4 | 1 | 0 | 0 | 4 | 0 | 0 | 0 | 0 | 0 |

We claim as our invention:

1. S-ethyl-N-benzoyl-N-(4-fluorophenyl)-2-aminothiopropionate.

* * * * *